Oct. 28, 1958  H. TERRELL  2,857,993
COLLAPSIBLE OIL WELL DERRICK
Filed Jan. 25, 1957  3 Sheets-Sheet 1
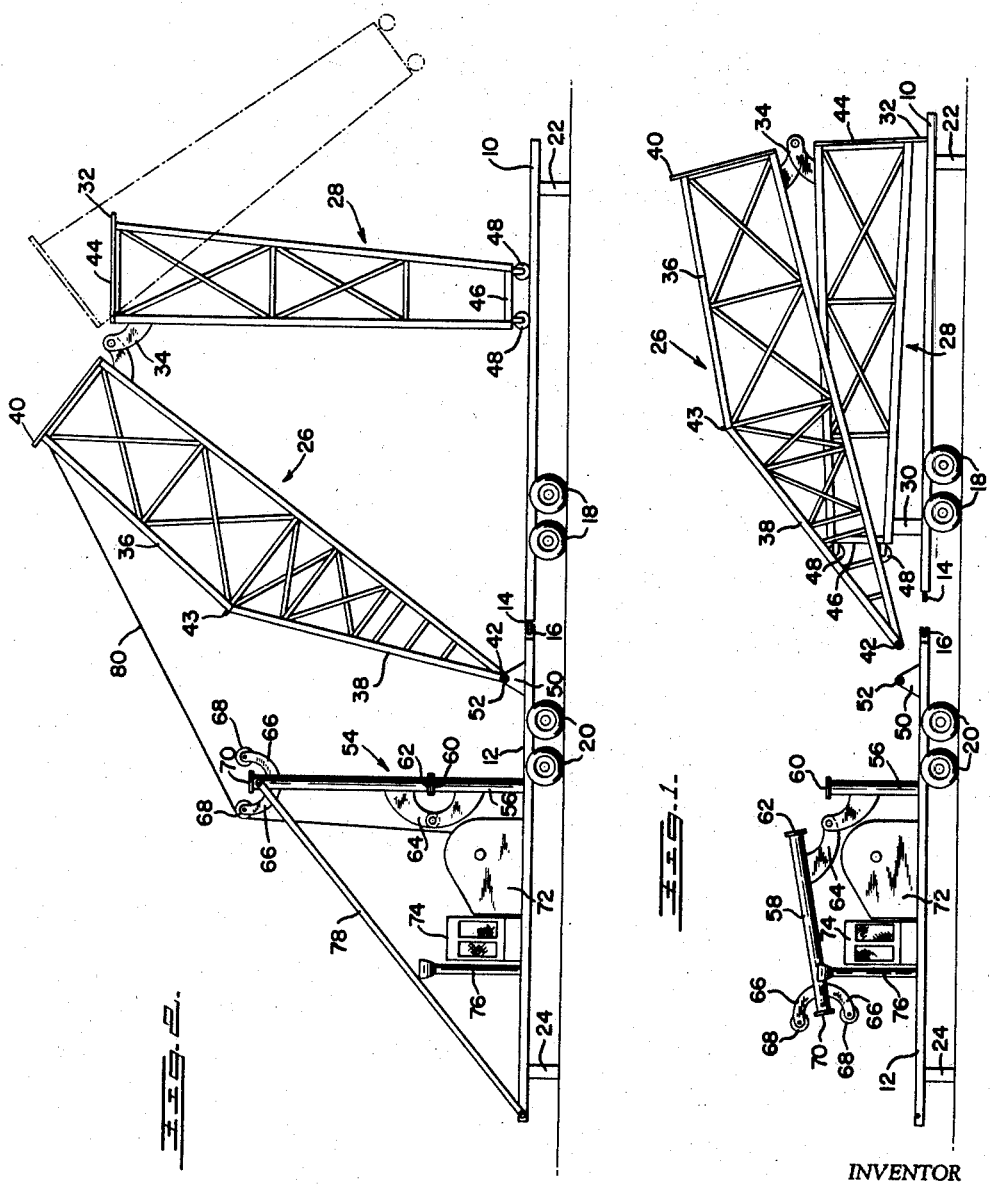
INVENTOR
HOMER TERRELL
BY *Justin Miller*
ATTORNEY

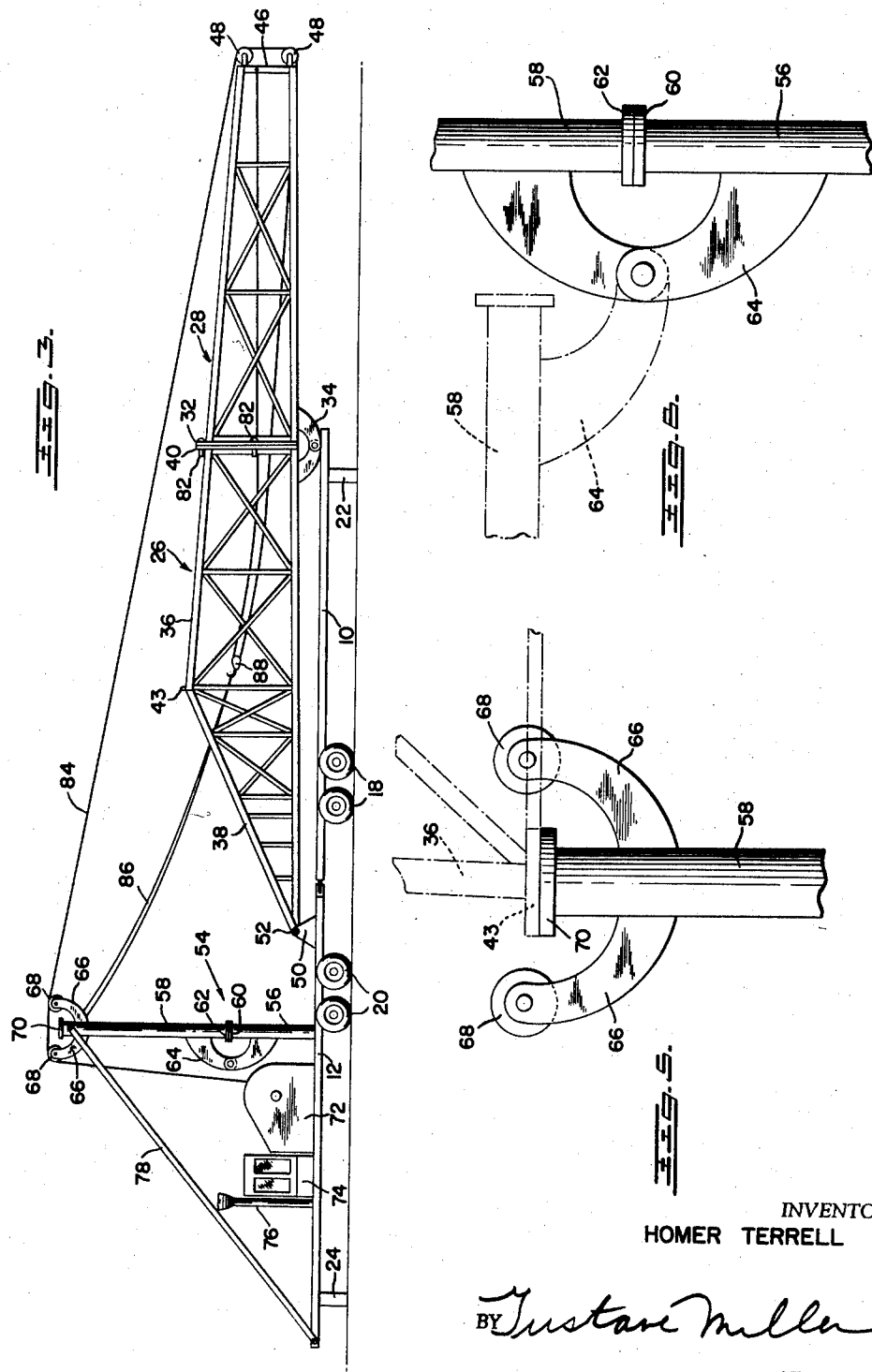

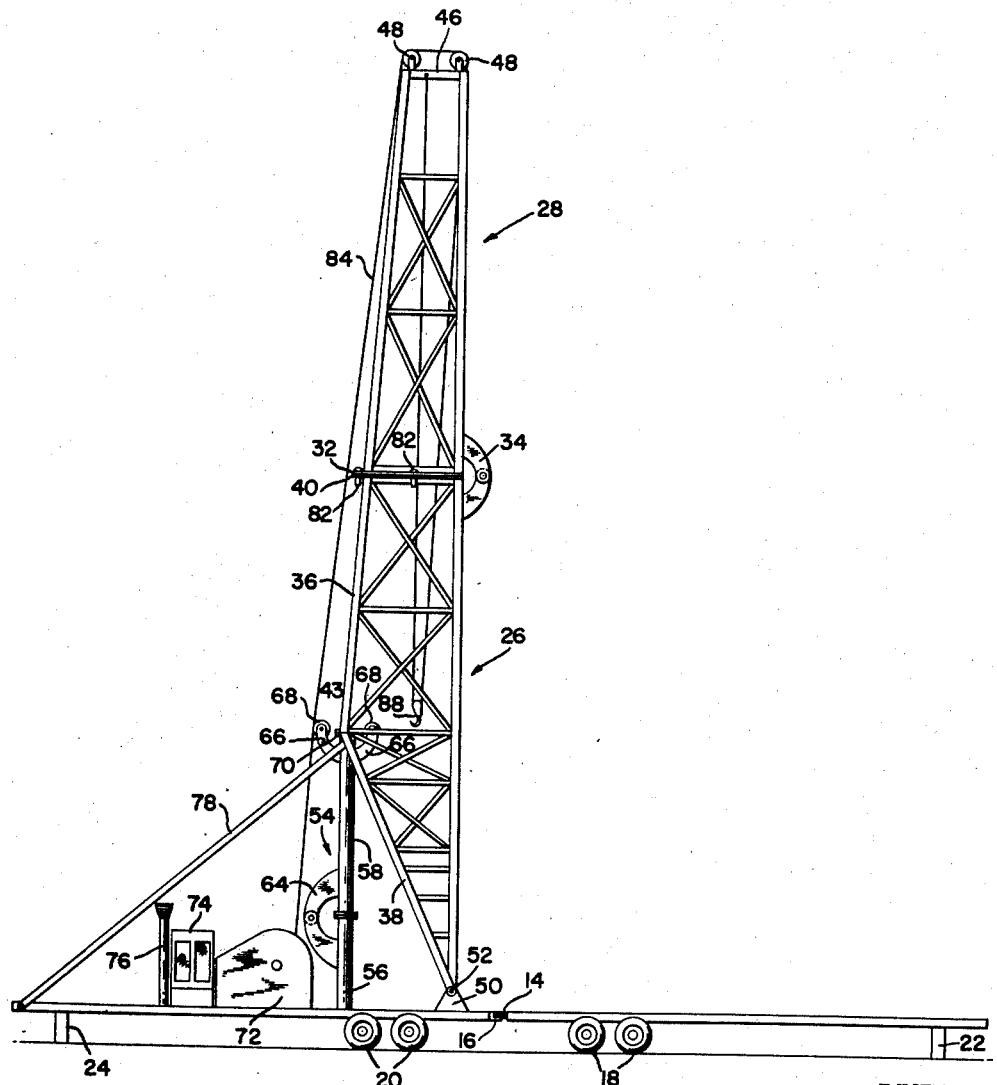

United States Patent Office 2,857,993
Patented Oct. 28, 1958

2,857,993

COLLAPSIBLE OIL WELL DERRICK

Homer Terrell, Cleveland, Tex.

Application January 25, 1957, Serial No. 636,380

3 Claims. (Cl. 189—11)

This invention relates to an oil well derrick, and it particularly relates to a derrick of the collapsible or portable type.

Heretofore, collapsible oil well derricks were quite bulky, difficult to set up and take down, and required the use of large hydraulic or pneumatic forces for erection or removal.

It is an object of the present invention to provide a collapsible oil well derrick which is relatively light in weight and easy to handle.

Another object of the present invention is to provide a collapsible oil well derrick which can be taken down from one location, moved to a second location, and set up in the second location in a minimum of time.

Other objects of the present invention are to provide an improved, collapsible oil well derrick, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 1 is a side elevational view, somewhat schematic, of a derrick apparatus embodying the present invention, the berrick being shown in folded position.

Fig. 2 is a view, similar to Fig. 1, but showing the derrick in the first stage of being assembled into operative postion.

Fig. 3 is a view, similar to Figs. 1 and 2, but showing the derrick in the second stage of assembly.

Fig. 4 is a view similar to Figs. 1, 2 and 3, but showing the derrick assembled in operative position.

Fig. 5 is a fragmentary, elevational view of the roller support assembly of the supporting post.

Fig. 6 is a fragmentary elevational view of the hinge portion of the supporting post, the hinge being shown in operative position in full line and in collapsed position in dotted outline.

Referring now in greater detail to the drawings wherein similar reference characters refer to similar parts, there is shown a support in the form of a trailer assembly comprising a front trailer 10 and a rear trailer 12. The front trailer 10 is adapted to be secured to a prime mover such as a truck, tractor, or the like, at its front end, and at its rear end is provided with a tongued coupling unit 14. The coupling unit 14 is adapted to be coupled with a complementary forked coupling unit 16 on the front end of trailer 12 in the ordinary manner. Each trailer is provided with sets of wheels, as at 18 and 20, for use during movement of the trailers, and when the trailers are in position, they are supported, at the ends opposite to their respective wheels, by blocks, as at 22 and 24.

The front trailer 10 is provided with a two-part derrick comprising lower section 26 and upper section 28, these sections being in collapsed, horizontal arrangement; and supported at one end by a removable support block 30 and at the other by a flange 32 at one end of derrick portion 28. The two sections 26 and 28 are connected to each other by a hinge mechanism 34 adjacent the mating ends of the derrick sections.

The derrick section 26 comprises a rectangular portion 36 at its upper end and a V-shaped portion 38 at its lower end. At the top of the portion 36 is a lateral flange 40 and at the bottom of the portion 38 is a pivot pin-holding member 42. At the juncture between the portions 36 and 38 is provided a flange element 43. The derrick section 28 inclines upwardly and inwardly from a generally wide base 44 to a narrower top end 46 (shown at the bottom in Fig. 2). At the end 46 is provided a set of rollers 48 adapted to support the derrick section 28 for movement along the trailer 10.

On the trailer 12, at the front portion thereof, is provided a pivot bracket 50 having openings adapted to mate with the pivot pin-holding member 42 to receive a pivot pin 52 to pivotally connect the lower end of the derrick section 26 to the bracket, and, thereby to the trailer 12.

Also mounted on the trailer 12 is a collapsible supporting post 54 comprising stationary lower section 56 and pivotal upper section 58. At the top of section 56 is a flange 60 adapted to mate with a corresponding flange 62 on the bottom of section 58 when the section 58 is pivoted into upright position on section 56. The sections 56 and 58 are pivotally connected by a hinge member 64.

At the top of section 58 are oppositely-extending roller support arms 66 upon which are rotatably mounted rollers 69. These arms 66 extend arcuately upward from a position just below the top of the post to a position just above the post. The top of the post itself is provided with a seating flange 70 upon which is adapted to seat the flange 43 when the derrick is set up in operative position.

Adjacent the post 54 is a winch mechanism 72 operated by a motor 74. A supporting strut 76 is situated adjacent the motor. This strut is adapted to support the section 58 of post 54 when the post is in folded or collapsed position, as in Fig. 1. A brace bar 78 is removably provided to hold the post braced in its upright, operative position, as in Figs. 2, 3 and 4.

In operation, when the rig is to be set up in position, the trailers 10 and 12 are moved together and coupled together by coupling means 14 and 16. A winch cable is then taken from a winch on a truck or the like, not shown, and passed over the folded derrick sections to the post 54. The end of the cable is then tied to post section 58 and drawn in until the section 58 pivots on its hinge 64 into the erect position overlying section 56 with flange 62 seated on flange 60. These flanges are then bolted together by bolts fitted through appropriate mating holes therein.

With the post 54 in erect position, a cable 80 is passed from winch 72 over the rollers 68 on the post, and fastened to the end of derrick section 26, as illustrated in Fig. 2. The winch is then operated to draw in the cable 80 until the section 26 is pulled partially up and the section 28 swings out on its rollers 48, as shown in Fig. 2. The cable 80 is then released from section 26 and fastened to the end 46 of section 28. The winch is then operated to pivot the section 28 on hinge 34 into horizontal position at the same time that section 26 is lowered into horizontal position. This places the derrick sections in aligned horizontal relationship, as shown in Fig. 3. In this position the two derrick sections are bolted together in end-to-end relationship as by bolts 82.

The cable 80 is then removed and cable 84 from winch 72 is passed over rollers 68 on post 54 and over rollers 48 on derrick section 28. Then one end of a bridle 86 is fastened at one end to the post 54 and at the other end to the travelling block hook 88 on the derrick; after which the brace bar 78 is bolted, at one end, to post 54 and, at its other end, to trailer 12. When this is done, the winch 72 is operated to pull in the cable 84 until the cable pulls the assembled derrick erect with the flange 43 of the derrick seated on flange 70 of the post. This is the operative position as shown in Fig. 4. In this position, the flanges 43 and 70 are bolted together by bolts passed through mating holes therein. The cable 84 is then slacked off by a slight unwinding of winch 72, after which the bridle 86 is unhooked from hook 88. The derrick assembly is in completely operative position.

Disassembly of the device takes place in the reverse manner as is obvious.

Although this invention has been described in considerable detail, such description is intended as being illustrative rather than limiting, since the invention may be variously embodied, and the scope of the invention is to be determined as claimed.

I claim:

1. A collapsible, readily portable, derrick mast assembly comprising a two vehicle part support, foldable, pivotally connected mast sections, one section constituting the base of the assembled mast and the other section constituting a continuation of the base when the mast is in extended position, means for securing said two vehicle parts together, said mast sections, when collapsed, being supported on one vehicle part support, a pivot bracket support on the other vehicle part support, a pivot pin on the lower end of said base section receivable in and supportable on said pivot bracket support, said lower end of said base section being V-shaped with said pivot pin located at the apex of its V, a foldable post on said other vehicle part support having a rigidly supported lower part terminating in an upper flange, an upper post part hingedly mounted on said lower post part having a complementary flange at its lower end securably mating with said lower part upper flange, an upper flange on said upper post part and a cooperating projecting bracket on said base section securable to said upper post part upper flange when said assembled mast is in upright position, a pair of oppositely aligned arcuate roller carrying arms on said uppermost part adjacent to but spaced from said upper flange, a winch on said other vehicle part and a cable on said winch securable over rollers on said roller carrying arms of said post to said mast parts, said other mast section having rollers on its end opposite its pivoted end for movably supporting said upper mast section end on said first vehicle part while said base mast section is being pivoted on said pivot bracket on said other vehicle part toward extended position, whereby said mast may be assembled by first securing said vehicle parts together, then securing said base mast section pivot pin in said pivot bracket support, assembling said foldable post in upright position, then operating said winch and cable to raise said base mast section to roll said upper mast section on its rollers over said first vehicle part to unfolded position, lowering said base section into alignment, securing said mast sections rigidly together, then lifting said secured mast sections to upright position and securing said mast bracket to said pole upper flange.

2. A collapsible, readily portable, derrick mast assembly comprising a two vehicle part support, foldable, pivotally connected mast sections, one section constituting the base of the assembled mast and the other section constituting a continuation of the base when the mast is in extended position, means for securing said two vehicle parts together, said mast sections, when collapsed, being supported on one vehicle part support, a pivot bracket support on the other vehicle part support, a pivot pin on the lower end of said base section receivable in and supportable on said pivot bracket support, said lower end of said base section being V-shaped with said pivot pin located at the apex of its V, a foldable post on said other vehicle part support having a rigidly supported lower part terminating in an upper flange, an upper post part hingedly mounted on said lower post part and having a complementary flange at its lower end securably mating with said lower part upper flange, an upper flange on said upper post part and a cooperating projecting bracket on said base section securable to said upper post part upper flange when said assembled mast is in upright position, a pair of oppositely aligned arcuate roller carrying arms on said upper post part adjacent to but spaced from said upper flange, a brace bar securable between the upper end of said upper post part and said other vehicle part and forming a triangle therewith for bracing said post and said mast in upwardly extending position, a winch on said other vehicle part and a cable on said winch securable over rollers on said roller carrying arms of said post to said mast parts, said other mast section having rollers on its end opposite its pivoted end for movably supporting said upper mast section end on said first vehicle part while said base mast section is being pivoted on said pivot bracket on said other vehicle part toward extended position, whereby said mast may be assembled by first securing said vehicle parts together, then securing said base mast section pivot pin in said pivot bracket support, assembling said foldable post in upright position, then operating said winch and cable to raise said base mast section to roll said upper mast section on its rollers over said first vehicle part to unfolded position, lowering said base section into alignment, securing said mast sections rigidly together, then lifting said secured mast parts to upright position and securing said mast bracket to said pole upper flange.

3. A collapsible, readily portable, derrick mast assembly comprising a two vehicle part support, foldable, pivotally connected mast sections, one section constituting the base of the assembled mast and the other section constituting a continuation of the base when the mast is in extended position, means for securing said two vehicle parts together, said mast sections, when collapsed, being supported on one vehicle part support, a pivot bracket support on the other vehicle part support, a pivot pin on the lower end of said base section receivable in and supportable on said pivot bracket support, said lower end of said base section being V-shaped with said pivot pin located at the apex of its V, a foldable post on said other vehicle part support having a rigidly supported lower part terminating in an upper flange, an upper post part hingedly mounted on said lower post part and having a complementary flange at its lower end securably mating with said lower part upper flange, an upper flange on said upper post part and a cooperating projecting bracket on said base section securable to said upper post part upper flange when said assembled mast is in upright position, a pair of oppositely aligned arcuate roller carrying arms on said upper post part adjacent to but spaced from said upper flange, a brace bar securable between the upper end of said upper post part and said other vehicle part and forming a triangle therewith for bracing said post and said mast in upwardly extending position, an upper post part receiving strut on said other vehicle part aligned to receive and support said upper post part in folded position, a winch on said other vehicle part and a cable on said winch securable over rollers on said roller carrying arms of said post to said mast parts, said other mast section having rollers on its end opposite its pivoted end for movably supporting said upper mast section end on said first vehicle part while said base mast section is being pivoted on said pivot bracket on said other vehicle part toward extended position, whereby said mast may be assembled by first securing said vehicle parts together, then securing said base mast section pivot pin in said pivot bracket support, assembling said foldable post in upright position, then operating said winch and cable to raise said base mast section to roll said upper mast section on its rollers over said first vehicle part to the unfolded position, lowering said base section into alignment, securing said mast sections rigidly together, then lifting said secured mast sections to upright position and securing said mast bracket to said pole upper flange.

References Cited in the file of this patent

UNITED STATES PATENTS

| | | |
|---|---|---|
| 1,697,940 | Turney | Jan. 8, 1929 |
| 2,065,715 | Leon | Dec. 29, 1936 |
| 2,364,851 | Johansen | Dec. 12, 1944 |
| 2,690,268 | Woolslayer et al. | Sept. 28, 1954 |